United States Patent [19]

Nagayama et al.

[11] Patent Number: 4,585,379
[45] Date of Patent: Apr. 29, 1986

[54] PRECISION POSITIONING DEVICE

[75] Inventors: Kazuhiko Nagayama, Kanagawa; Masami Masuda; Yukio Maeda, both of Yokohama, all of Japan

[73] Assignee: Hitachi, Ltd., Tokyo, Japan

[21] Appl. No.: 333,632

[22] Filed: Dec. 22, 1981

[30] Foreign Application Priority Data

Dec. 27, 1980 [JP] Japan .................................. 55-187128
Sep. 2, 1981 [JP] Japan .................................. 56-136981

[51] Int. Cl.⁴ ........................ B23Q 15/00; G01B 9/02
[52] U.S. Cl. .................... 409/147; 51/165.72; 318/640; 356/358; 408/13; 408/130; 409/186; 409/207
[58] Field of Search ................ 408/16, 11, 13, 130; 409/147, 148, 149, 162, 164, 167, 198, 204; 356/358, 363, 375; 33/1 M, DIG. 21; 318/640; 364/475, 560; 51/165.72

[56] References Cited

U.S. PATENT DOCUMENTS

| | | | |
|---|---|---|---|
| 3,164,040 | 1/1965 | Reynolds | 408/130 |
| 3,466,951 | 9/1969 | Greenberg | 409/165 X |
| 3,515,481 | 6/1970 | Brault et al. | 356/73 |
| 3,562,538 | 2/1971 | Mergler | 82/34 R X |
| 3,635,108 | 1/1972 | Prince | 82/1 R |
| 3,661,463 | 5/1972 | Brainard | 356/358 |
| 3,812,376 | 5/1974 | Takeyama et al. | 356/357 X |
| 3,884,580 | 5/1975 | Webster et al. | 356/358 |
| 3,899,265 | 8/1975 | Lang | 408/130 X |
| 4,365,301 | 12/1982 | Arnold | 318/640 X |
| 4,377,036 | 3/1983 | Dangschat | 33/125 A |

Primary Examiner—Gil Weidenfeld
Assistant Examiner—Glenn L. Webb
Attorney, Agent, or Firm—Antonelli, Terry & Wands

[57] ABSTRACT

In effecting positioning of a workpiece relative to a working tool, indexing is carried out by obtaining precision measurement of the relative distance between the workpiece and the working tool by using a laser beam. Positioning can be effected with improved precision and working can be achieved with improved dimensional accuracy.

10 Claims, 5 Drawing Figures

PRECISION POSITIONING DEVICE

BACKGROUND OF THE INVENTION

1. Field of the Invention

This invention relates to a precision positioning device capable of effecting precision positioning of a workpiece and a working tool relative to each other with a high degree of accuracy in a machine tool, such as a grinder, lathe, etc.

2. Description of the Prior Art

In recent years, attempts have been made to achieve developments by leaps and bounds in industries concerned with peripheral equipment of computers, semiconductors, household electrical appliances, etc., for the purpose of producing articles of high performance, compact size, light weight and low cost. With this tendency, there has been created a demand for effecting positioning with a high degree of precision of parts of high hardness and high brittleness, such as magnetic heads, silicone wafers, etc.

For example, a magnetic head of a VTR is made of ferrite in the form of a rectangular parallelepiped having a width of 2.3 mm, a depth of 1.7 mm and a height of 0.14 mm, in approximate figures. However, owing to an increase in the density of recordings, the track width governing the density of recordings has increased in precision from 60±3 μm to 28±2 μm, and the present tendency is to obtain a further reduction in track width and to achieve a closer tolerance. Parts, such as magnetic heads, are very small in size as aforesaid and difficulties are encountered in handling them. Thus in production, it is usually effective practice to work on a large number of similar parts as by a grinder in a single operation and to separate them from one another after the parts are assembled. It is required, therefore, that in working on magnetic heads for obtaining correct track width, not only a single pitch but also the cumulative pitch have high precision, and in a machine tool, such as a grinder, it is essential that there be provided means for effecting precision positioning of a working tool and a workpiece.

As a mechanism for effecting precision positioning of a tool and a workpiece in a machine tool, it has been proposed to use means presently to be described for cutting a workpiece or forming grooves therein at arbitrarily selected spacing intervals.

When a workpiece is affixed to an X-Y table and such table is moved in a work indexing direction (an X-direction, for example) by means of a feed screw rotated by a motor, the amount of movement is measured accurately by means of a laser measuring system composed of a laser oscillator, an I/O interface, an interferometer, a reflector, a receiver, etc., and the measurements are fed back to a control of the motor, so as to thereby effect precision positioning.

However, some disadvantages are associated with this type of positioning mechanism. For example, in the aforesaid positioning mechanism, it is possible to measure the distance covered by the movement of the X-Y table in the work indexing direction with a high degree of precision by using a laser beam. However, it is difficult to determine accurately the distance between a workpiece and a working tool that governs the precision with which working is done or the precision with which indexing is performed, because changes in ambient temperature that might occur during working operation might cause variations to occur in the dimensions of a rotary shaft supporting the working tool or the X-Y table on which the workpiece is fixed.

Thus it is difficult to obtain precision positioning of a high degree by the aforesaid precision mechanism, with better than ±1.5 μm and ±8 μm being the limits for a single pitch and accumulated pitch respectively.

The result of this is that in a process step of working on a magnetic head for forming a track width, it is difficult to improve the precision with which working is carried out and the yield rate is no higher than about 98%. Thus inability to effect precision positioning is the main factor concerned in reducing productivity.

SUMMARY OF THE INVENTION

This invention has as its object the provision of a positioning device capable of effecting with a high degree of precision positioning of a workpiece and a working tool relative to each other to effect accurate positioning, so as to thereby improve the yield of products.

The aforesaid object is accomplished according to the invention by measuring the position of not only a mounting section on which the workpiece is mounted but also a working section in which the working tool is located with a high degree of precision by means of a laser measuring system and effecting positioning of the workpiece and the working tool relative to each other by feed means while confirming the relative positions thereof. Thus high precision positioning can be effected without producing errors that might otherwise occur due to the influences exerted by changes in environmental conditions, such as ambient temperature.

DESCRIPTION OF THE PREFERRED EMBODIMENTS

Preferred embodiments of the invention will now be described by referring to the accompanying drawings.

Figure 1:
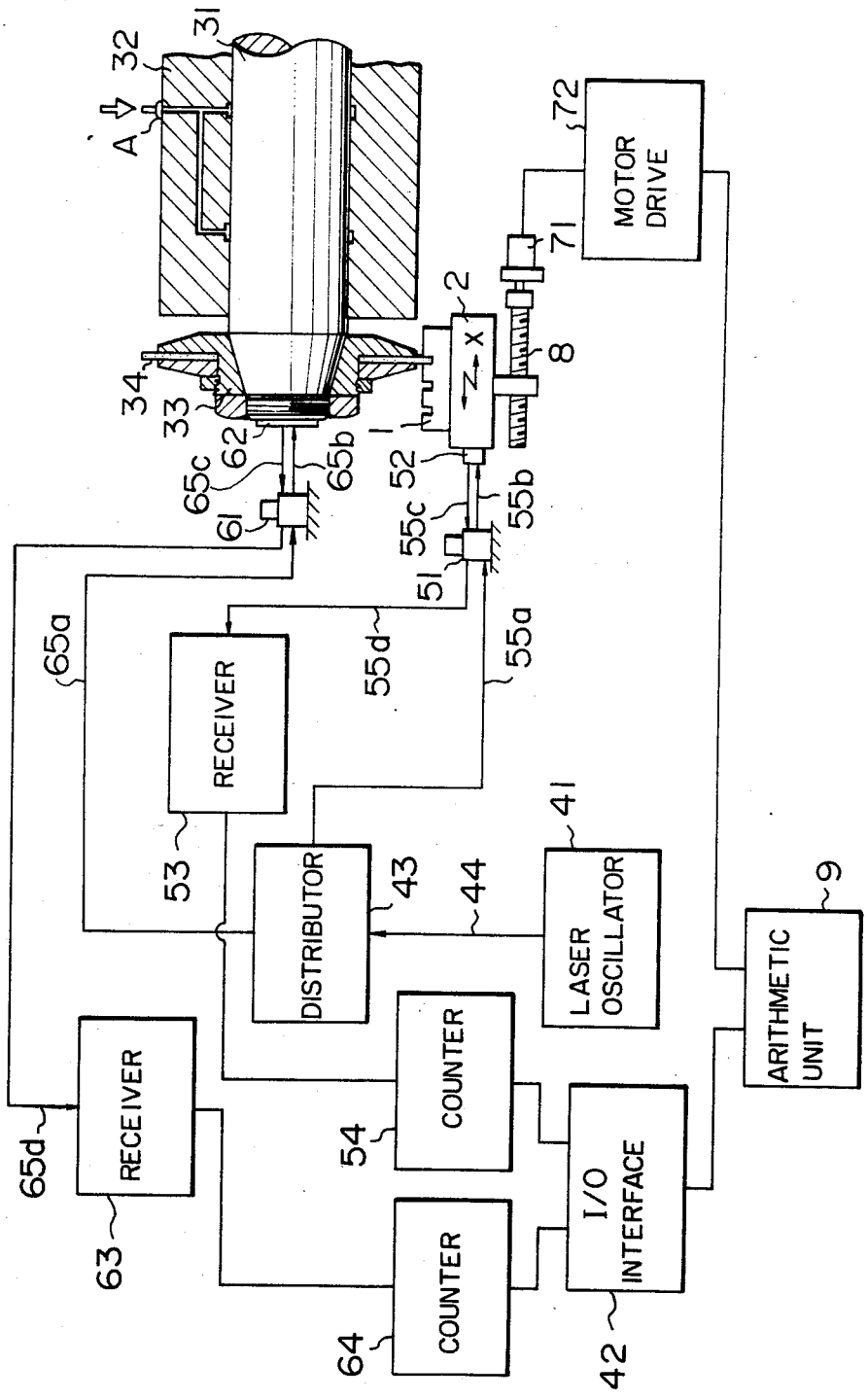
FIG. 1 is a schematic view of a cutting machine incorporating therein a first embodiment of the positioning device in conformity with the invention.

FIG. 1 is a schematic view in which a cutting machine incorporating therein the precision positioning device comprising a first embodiment of the invention is illustrated. Referring to FIG. 1, a workpiece 1 is supported on an X-Y table 2 by suitable means, and the X-Y table 2 has connected thereto a feed screw 8 for moving the table 2 in an X-direction (work indexing direction) which in turn has connected thereto a feed motor 71 either directly or through speed reducing gearing, not shown. The feed motor 71 is connected to an arithmetic unit 9 through the motor drive 72. The arithmetic unit 9 which is preferably a microcomputer or minicomputer comprises a data readout routine for reading out data from an I/O interface 42 of a laser measuring system, a routine for effecting correction of a value obtained in indexing operation and a memory, and is operative to read out the respective positions of the X-Y table 2 and a working tool 34 and do calculation of a value to be used for effecting necessary correction of the value obtained to change same to a desired indexing value. The laser measuring system comprises a laser oscillator 41, a distributor 43 for dividing into two laser beams 55a and 65a a laser beam 44 issuing from the laser oscillator 41, interferometers 51 and 61 affixed in suitable positions in such a manner that the laser beams 55a and 65a from the distributor 43 and laser beams 55c and 65c produced as the laser beams 55a and 65a are reflected by reflectors 52 and 62 respectively are made to interfere with incident beams, receivers 53 and 63 receiving laser beams 55d and 65d issuing from the interferometers 51 and 61 for converting the received beams into pulses respectively, counters 54 and 64 for performing addition and deduction of the pulses issuing from the receivers 53 and 63 respectively, and the I/O interface 42 referred to hereinabove connecting the counters 54 and 64 to the arithmetic unit 9.

A rotary shaft 31 having at one end portion thereof a flange 33 supporting a working tool 34 is journaled by a fluid bearing formed of air or oil supplied at a suitable pressure through a supply port A formed in a bearing 32 to a gap defined between the shaft 31 and the bearing 32, for rotation at a predetermined number of revolutions.

Figure 2:
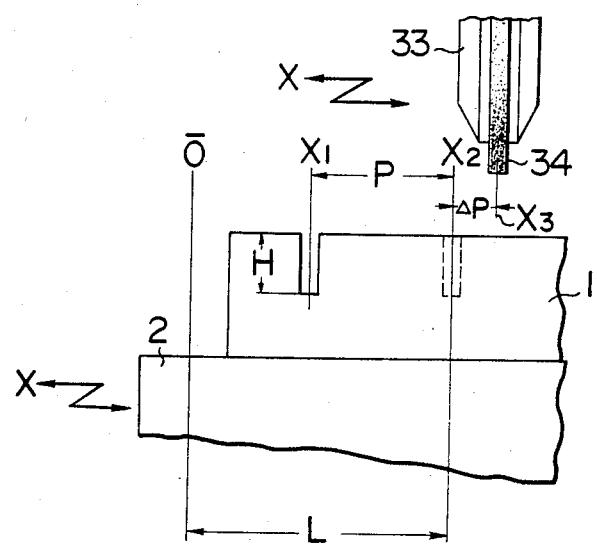
FIG. 2 is a view in explanation of the movement of the rotary shaft and the X-Y table in effecting correction of indexing.

In operation, the X-Y table 2 is moved as shown in FIG. 2 for effecting correction of a value obtained in indexing operation. After a groove is formed by the working tool 34 in an arbitrarily selected position $X_1$ in the workpiece 1 supported on the X-Y table 2, the X-Y table 2 is moved by rotating the feed motor 71 in a suitable direction for positioning the center of the working tool 34 in the next following target position $X_2$. The rotation of the feed motor 71 is stopped when the distance covered by the movement of the X-Y table 2 as measured by the laser measuring system 51-54 for measuring the displacement thereof becomes equal to the desired pitch P or the distance L from the origin $\overline{O}$ to the target position $X_2$, to thereby interrupt the movement of the X-Y table 2. Owing to a change in room temperature, for example, that might occur while the X-Y table 2 is moving for the pitch P or distance L, the rotary shaft 31 might undergo a change in position and the working tool 34 might be indexed with a position $X_3$, thereby producing an error $\Delta P$ with respect to the target value. When this is the case, the error $\Delta P$ is measured by the laser measuring system 61-64 for measuring changes in the position of the rotary shaft 31 and the arithmetic unit 9 gives instructions to the feed motor 71 to rotate same in a suitable direction in accordance with the error $\Delta p$. Thus the movement of the X-Y table 2 is controlled in a manner to bring the center of the working tool 34 into index with the target position $X_2$ by correcting the error $\Delta P$. The arithmetic unit 9 is provided with a memory which is operative to measure the displacement of the X-Y table 2 relative to the rotary shaft 31 at all times and store the information and also store information on the X-Y table 2 before the indexing movement and the groove forming pitch P or distance L. Thus the arithmetic unit 9 calculates the error $\Delta P$ in indexing operation and supplies a desired output to the motor 71.

From the foregoing description, it will be appreciated that according to the invention, when positioning of a working tool relative to a workpiece is performed, the distance covered by the movement of the workpiece is indexed by moving the X-Y table 2 and then an indexing error committed by the X-Y table 2 and the amounts of expansion or contraction of the rotary shaft 31 and X-Y table 2 due to a change in room temperature, for example, are measured by a laser measuring system, so that any error that might occur in a value obtained in the indexing operation can be corrected by effecting fine movements of the rotary shaft 31 for an amount corresponding to the error. Thus precision positioning can be effected positively and quickly, thereby enabling the yield of the products to be improved.

Figure 3:
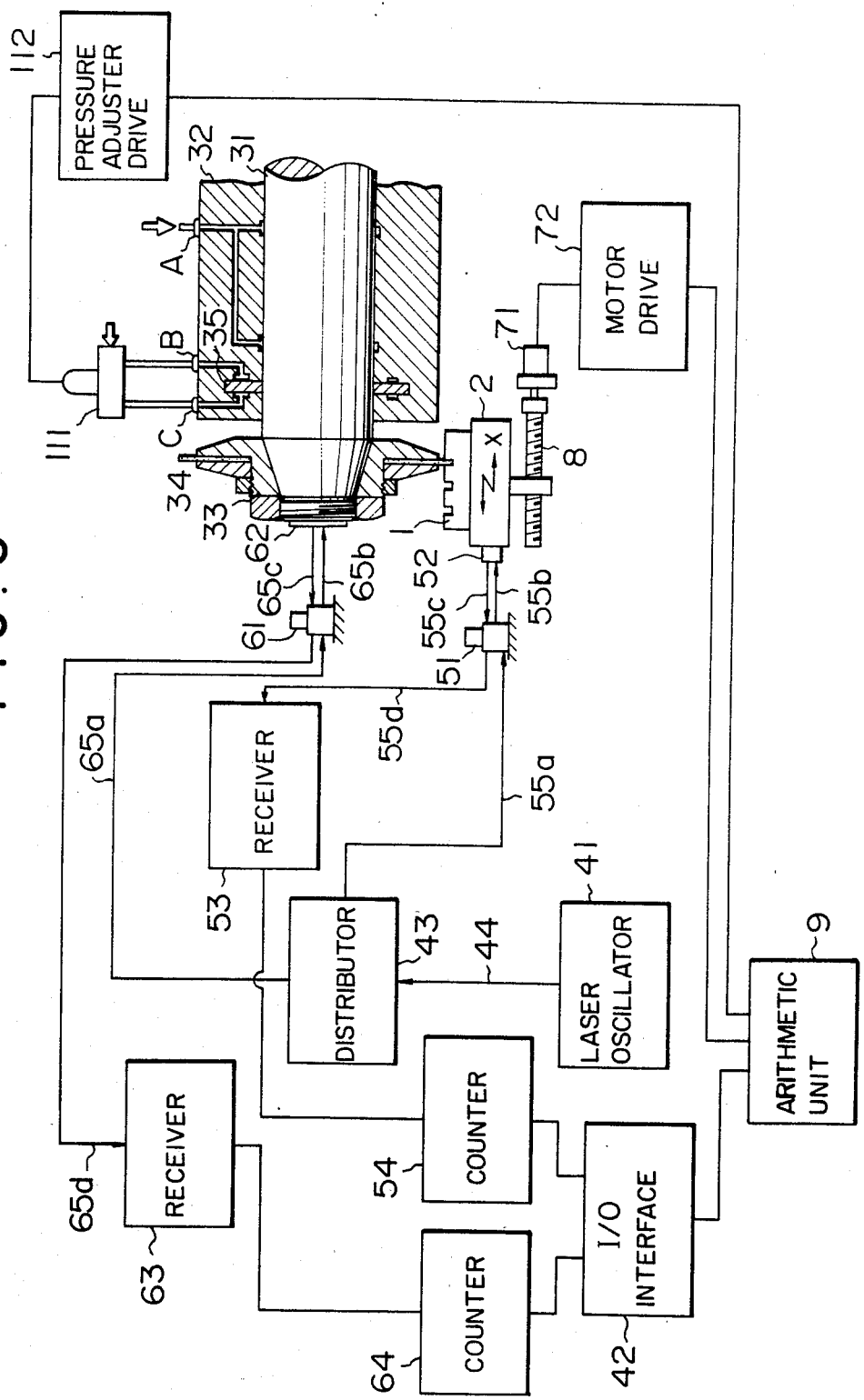
FIG. 3 is a schematic view of a cutting machine incorporating therein a second embodiment of the positioning device in conformity with the invention.

FIG. 3 shows a second embodiment of the invention as incorporated in a cutting machine shown in a schematic view. In FIG. 3, parts similar to those shown in FIG. 1 are designated by like reference characters and description thereof will be omitted.

This embodiment is characterized by the provision of a thrust plate 35 to the rotary shaft 31 which is disposed on the outer circumference of the rotary shaft 31 and extends in a direction perpendicular to the longitudinal axis thereof, so that the thrust plate 35 and the bearing 32 constitute a fluid thrust bearing. The bearing 32 is formed with supply ports B and C for supplying a fluid, such as air or oil, to axial gaps between the thrust plate 35 and the bearing 32. The supply ports B and C are connected to a pressure adjuster 111 for controlling the pressure of the fluid, the pressure adjuster 111 being connected to the arithmetic unit 9 via a pressure adjuster drive 112.

Assume that the rotary shaft 31 is rotated at a predetermined number of revolutions while a fluid, such as air or oil, which is controlled to have a suitable pressure by the pressure adjuster 111 is supplied at all times to the axial gaps between the thrust plate 35 and the bearing 32 through the supply ports B and C. When an indexing error $\Delta P$ is produced due to a change in room temperature, for example, as described by referring to FIG. 2, the arithmetic unit 9 gives instructions, when the error $\Delta P$ is very small and a value obtained in the indexing operation is within an allowable range, to the pressure adjuster 111 to drive same to cause a relative change corresponding to the error $\Delta P$ to occur to the pressures of the fluid supplied through the supply ports B and C to the axial gaps, to thereby move the shaft 31 in a suitable direction. The pressure adjuster 111 is rendered inoperative when the displacement measured by the laser measuring system 61-64 coincides with the error $\Delta P$, to thereby fix the rotary shaft 31 in position to effect final indexing. When the error $\Delta P$ exceeds the allowable range, coarse adjustments are carried out by moving the X-Y table 2 and then fine adjustments are effected as described hereinabove.

From the foregoing description, it will be appreciated that in the embodiment shown in FIG. 3, the precision with which indexing of the working tool 34 with the workpiece 1 is effected can be improved by performing adjustments in two stages. That is, coarse adjustments are effected by driving the feed motor 71 to move the X-Y table 2 to tentatively adjust the relative distance between the workpiece 1 and the working tool 34. The fine adjustments are effected by causing a relative change to occur in the pressures of the fluid supplied to the axial gaps between the thrust plate 35 and the bearing 32 in the thrust bearing to effect fine adjustments of the position of the rotary shaft 31 by moving same by the differential pressure. Preferably the thrust plate 35 is located on the outer circumference of the rotary shaft 31 in a position as close to the working tool 34 as possible.

Figure 4:
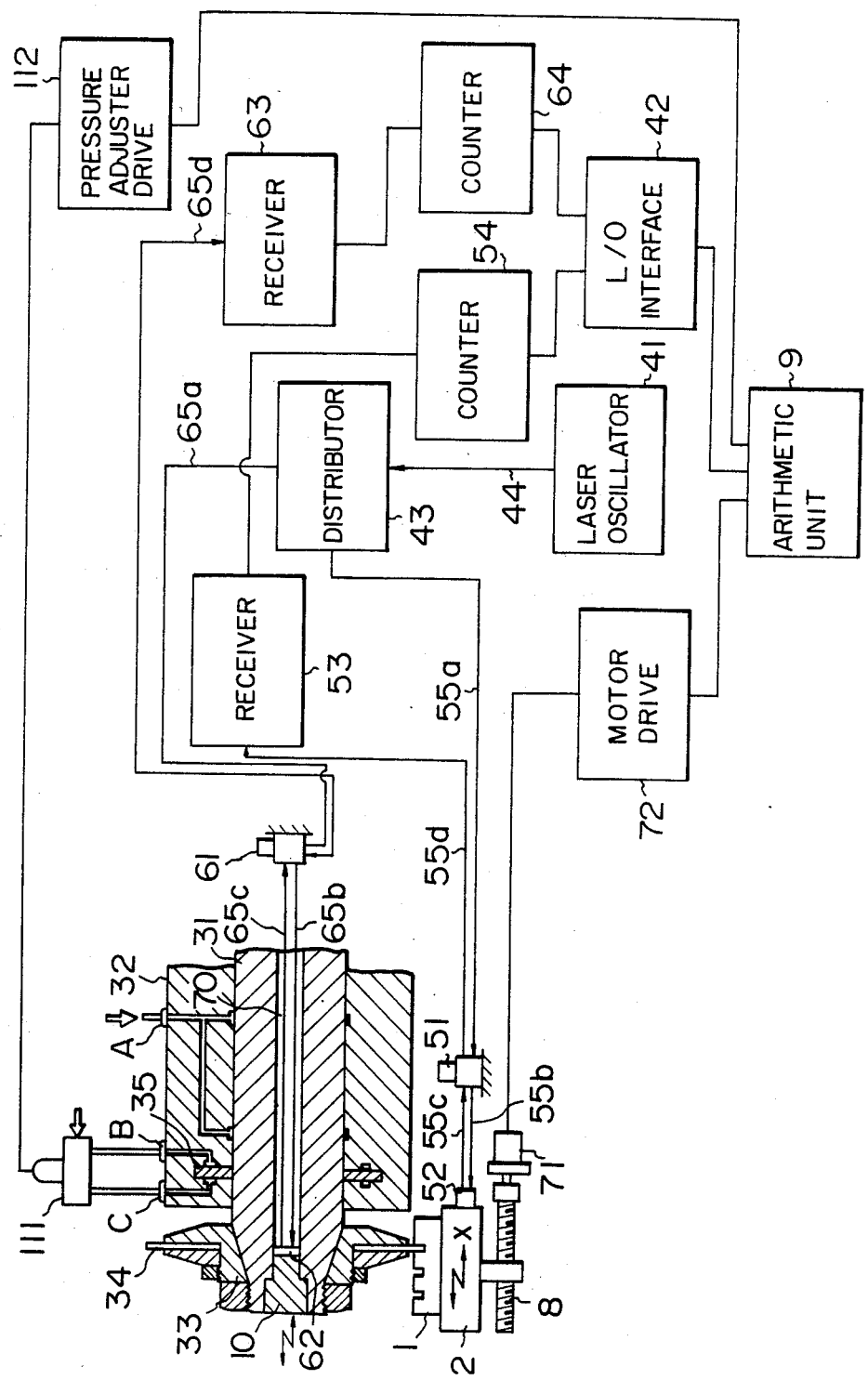
FIG. 4 is a schematic view of a cutting machine incorporating therein a third embodiment of the positioning device in conformity with the invention.

A third embodiment will now be described. FIG. 4 shows the third embodiment as incorporated in a cutting machine. Parts shown in FIG. 4 which are similar to those shown in FIGS. 1 and 2 are designated by like reference characters and their description will be omitted.

The third embodiment is characterized in that the rotary shaft is formed with an axial bore of a suitable diameter and a reflector is arranged within the axial bore in a position immediately beneath the position of the working tool. More specifically, as shown in FIG. 4, the rotary shaft 31 is formed with an axial bore 70 of a diameter suitable for allowing laser beams 65b and 65c to pass therethrough. The reflector 62 mounted for measuring the displacement of the rotary shaft 31 is fixed to a reflector fixing member 10 and located within the axial bore 70 immediately below the working tool 34. The embodiment offers the advantage that an error that might occur in carrying out the measuring operation due to influences that might be exerted by the working tool 34 and its environment, such as interruption of the laser beams 65b and 65c by the particles of scattered grinding liquid or chips or deposition thereof on the reflector can be avoided so that the position of the rotary shaft 31 can be positively measured and replacement of the working tool 34 by a new one can be readily carried out.

Figure 5:
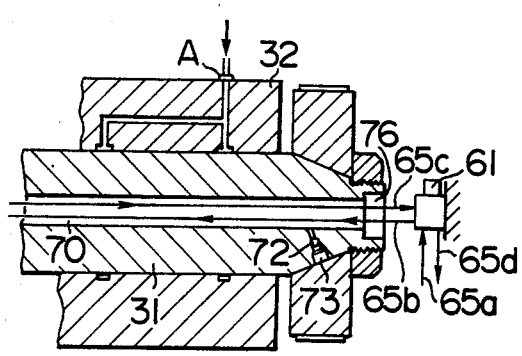
FIG. 5 is a view in explanation of an end portion of the rotary shaft of a fourth embodiment of the positioning device in conformity with the invention.

A fourth embodiment shown in FIG. 5 will be described. FIG. 5 shows an end portion of the rotary shaft 31 opposite the end portion thereof on which the working tool 34 is fixed. In FIG. 5, parts similar to those shown in FIG. 4 are designated by like reference characters and description thereof will be omitted. In FIG. 5, a transparent glass plate 76 having accurate parallelism thicknesswise thereof is adhesively attached to the end of the rotary shaft 31 in airtight relation. A vacuum is created in the axial bore 70 by evacuating the atmosphere therein through an evacuating port 73 formed in a suitable position in the rotary shaft 31. The port 73 is sealed by a head valve 72. By keeping the path of laser beams in a vacuum, it is possible to eliminate an error that might be produced in the measuring operation between the reflector 62 and the interferometer 61 due to uneven distribution of the density of air in the axial bore 70 attributed to high-speed rotation of the rotary shaft 31, thereby enabling correct measurements to be obtained. In place of evacuating the axial bore 70, a gas of low specific gravity, such as hydrogen, helium, etc., may be sealed in the axial bore 70 to achieve the same result.

What is claimed is:

1. A precision positioning device comprising a mounting section for supporting a workpiece, a working section having a working tool attached thereto, and feed means mounted on at least one of said mounting section and said working section for positioning the workpiece and the working tool relative to each other in a direction along a predetermined axis, such precision positioning device further comprising a first laser instrument comprising a first reflector mounted on the mounting section for reflecting a laser beam to enable the position of the mounting section in a direction along said predetermined axis to be read out, a second laser instrument comprising a second reflector arranged in the working section for reflecting a laser beam to enable the position of the working section in a direction along said predetermined axis to be read out, means for calculating the distance between the workpiece and the working tool in a direction along said predetermined axis based on the read outs obtained from the first laser instrument and the second laser instrument, and wherein the feed means is operable for positioning of the workpiece and the working tool relative to each other in a direction along said predetermined axis on the basis of the distance calculated by the means for calculating, wherein said working section is a rotary shaft having the working tool attached to one end thereof, said rotary shaft being formed with a bore extending axially therethrough and having the second reflector mounted therein for reflecting the laser beam in a position substantially immediately below the working tool.

2. A precision positioning device as claimed in claim 1, wherein said rotary shaft has a transparent plate attached to an end thereof opposite the end at which said working tool is supported to seal the axial bore in airtight relation to enable the axial bore to be evacuated.

3. A precision positioning device as claimed in claim 1, wherein said rotary shaft has a transparent plate attached to an end thereof opposite the end at which said working tool is supported to seal the axial bore in airtight relation to enable a gas of low specific gravity to be contained therein.

4. A precision positioning device for a working apparatus comprising:
    (a) a first supporting means for supporting a workpiece;
    (b) a second supporting means supporting a rotary shaft to which a working tool is rigidly attached, said rotary shaft being connected to a drive means so as to be rotatable around a predetermined axis by said drive means;
    (c) feeding means for feeding at least one of said first supporting means and said second supporting means relative to each other in a direction along said predetermined axis;
    (d) a first laser instrument including a first reflector mounted on said first supporting means for reflecting a laser beam to enable the positioning of said workpiece in the direction along said predetermined axis to be read out;
    (e) a second laser instrument including a second reflector mounted substantially on the axis of rotation of the rotary shaft to which said working tool is attached for reflecting a laser beam in a manner enabling the position of said working tool in the direction of said predetermined axis to be read out; and
    (f) a calculating means for calculating a relative displacement between said workpiece and said working tool in accordance with measurements obtained from the read out of said first laser instrument and said second laser instrument,
    wherein said feeding means is operable on the basis of the calculated relative displacement obtained from said calculating means.

5. A precision positioning device as claimed in claim 4, wherein said feeding means includes a table, a feed screw and a feed motor, said table being connected through said feed screw to said feed motor.

6. A precision positioning device as claimed in claim 5, wherein the rotary shaft has one end attached to the working tool and is journaled by a fluid bearing, said rotary shaft being further provided with a thrust plate attached thereto perpendicular to the axis thereof, and a fluid thrust bearing constituted in said fluid bearing in axial gaps provided between the fluid bearing and opposite sides of the thrust plate for receiving pressurized fluid; and a pressure controlling means being provided for controlling the pressure applied by a fluid fed to the axial gaps formed between the fluid bearing and the opposite sides of the thrust plate to enable the rotary shaft to move a small axial displacement in a direction along said predetermined axis as a result of adjustment of the fluid pressure differential of the fluid thrust bearing; wherein the feed motor is actuatable to effect rough adjustment of the relative displacement of the working tool and the workpiece in a direction along said predetermined axis by actuating the feed motor to move the table, and the pressure applied to the axial gaps in accordance with said calculated relative displacement is controllable for effectuating fine adjustment of the relative displacement thereof in said direction.

7. A precision positioning device as claimed in claim 4, wherein the rotary shaft is attached to the working tool at one end and is formed with a bore extending axially therethrough to thereby allow said second reflector mounted therein to detect the laser beam reflected thereto.

8. A precision positioning device as claimed in claim 5, wherein said rotary shaft is attached to the working tool at one end and is formed with a bore extending axially therethrough to thereby allow said second reflector mounted therein to detect the laser beam reflected thereto.

9. A precision positioning device as claimed in claim 6, wherein said rotary shaft of said second supporting means has one end attached to the working tool and is formed with a bore extending axially therethrough to thereby allow said second reflector mounted therein to detect the laser beam reflected thereto.

10. A precision positioning device for a working apparatus comprising:
  (a) a first supporting means for supporting a workpiece;
  (a) a second supporting means supporting a rotary shaft to which a working tool is rigidly attached at a forward end of said shaft, said rotary shaft being formed with a bore extending axially therethrough to a back side of said supporting means and said rotary shaft being connected to a drive means so as to be rotatable around a predetermined axis by said drive means;
  (c) feeding means for feeding at least one of said first supporting means and said second supporting means relative to each other in a direction along said predetermined axis;
  (d) a laser instrument including a reflector mounted on said first supporting means for reflecting a laser beam to enable the positioning of said workpiece in the direction along said predetermined axis to be read out;
  (e) a member provided in said bore in a position along said predetermined axis substantially corresponding to the position of said working tool along said predetermined axis and measuring means operable in said bore in back of said member for measuring the position of the member provided in said bore along said predetermined axis in a manner enabling the position of said working tool in a direction of said predetermined axis to be read out; and
  (f) a calculating means for calculating a relative displacement between said workpiece and said working tool in accordance with measurements obtained from the read out of said laser instrument and said measuring means, wherein said feeding means is operable on the basis of the calculated relative displacement from said calculating means.

* * * * *